UNITED STATES PATENT OFFICE.

EDUARD MUSIL, OF VIENNA, AUSTRIA-HUNGARY.

MANUFACTURE OF YELLOW-FIBERED PAPER FOR BANK NOTES, CHECKS, &c.

SPECIFICATION forming part of Letters Patent No. 282,106, dated July 31, 1883.

Application filed October 6, 1882. (Specimens.)

*To all whom it may concern:*

Be it known that I, EDUARD MUSIL, a citizen of Austria, residing at Vienna, in Austria, have invented certain new and useful improvements in the manufacture of a yellow-fibered paper, applicable, in preference, for the use of State papers, bank notes, checks, shares, &c., of which the following is a full and clear description.

This invention has for its object the manufacture of a yellow-fibered paper, applicable, in preference, for the use of State papers, bank notes, checks, shares, &c.

The manufacture of this new paper is as follows: I take the usual nearly-finished paper-pulp and mix intimately and uniformly with it (according to requirements) more or less yellow-colored fibers in the cylinder-mill. The resulting paper-pulp or stuff is then drawn by the vat or worked up and finished on the ordinary paper-machine.

The coloring of the fiber is obtained by treating vegetable or animal substances containing albumen or albuminous-like ingredients, or both together—as raw jute, raw linen, raw flax, silk, wool, feathers, hair, &c.—with diluted nitric acid. This operation is carried through in the following way: I bring the fiber to be colored, in preference at the ordinary temperature, in a bath of diluted nitric acid, and leave it therein long enough for it to acquire the desired yellow color of a uniform and unalterable tint. The colored-fiber mass is thoroughly washed at the ordinary temperature until the water does not show any acid reaction, and is then dried.

The degree of concentration of the nitric acid to be used, and the duration of the treatment in and with it, can only be determined by the degree of coloration or tint one desires to obtain—the more concentrated the acid used the less time will be required for obtaining the deepest possible tint; but the acid ought not to be employed in a too concentrated state, because it would destroy the fiber, while a too much diluted acid would scarcely produce any coloration, or only after a very long time. I find, in practice, that by mixing ten to fifty per cent. of the marketable nitric acid of a specific gravity of 1,368 with one hundred parts of water, and by exposing the fiber mass for from twelve to forty-eight hours in the bath, good results are obtained.

The yellow-fibered paper obtained by this process is peculiarly applicable for the manufacture of State papers, bank notes, shares, and the like, in consequence of its yellow-colored fibers, which resist the action of light, air, and chemical agencies, and their optical comportment is such that these fibers, by being printed upon, are hardly perceptible, while being submitted to a photographic exposure their color is entirely changed, (becoming black,) so that an imitation by these means appears impossible.

I would have it understood that I do not claim as my invention the coloration of animal fibers by means of diluted nitric acid; but fibers treated as herein described form an indispensable element in carrying out my process, and they are intermixed or commingled with the paper-pulp in the vat, and which has not undergone any such treatment.

Having now described and particularly ascertained the nature of the said invention and the manner in which it is to be or may be used and carried into effect, I would observe, in conclusion, that what I consider to be novel and original, and therefore claim as the invention secured to me by the hereinbefore-recited Letters Patent, is—

1. As an element or ingredient for admixture with the paper-pulp in the vat for the manufacture of a paper for value-papers, bank-notes, bonds, &c., the described fiber containing albumen and treated with diluted nitric acid, and whereby, with the paper fabricated from such mixture, the taking off of a clear picture by way of photography, and the further preparation of a suitable printing-plate from such photographic copy will be rendered impossible.

2. The described paper made from an admixture with ordinary pulp in the vat of a fiber containing albumen, treated, as set forth, with diluted nitric acid, and for the purpose described.

EDUARD MUSIL.

Witnesses:
ED. SCHMIDT,
JAMES RILEY WEAVER.